US012649458B2

(12) United States Patent (10) Patent No.: US 12,649,458 B2
Yamasaki et al. (45) Date of Patent: Jun. 9, 2026

(54) VEHICLE MOTION CONTROL DEVICE AND VEHICLE MOTION CONTROL METHOD

(71) Applicant: Hitachi Astemo, Ltd., Hitachinaka (JP)

(72) Inventors: Masaru Yamasaki, Tokyo (JP); Kenta Maeda, Tokyo (JP); Shuji Ohshita, Hitachinaka (JP); Kentarou Ueno, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 145 days.

(21) Appl. No.: 18/569,391

(22) PCT Filed: May 18, 2022

(86) PCT No.: PCT/JP2022/020684

§ 371 (c)(1),
(2) Date: Dec. 12, 2023

(87) PCT Pub. No.: WO2023/286446

PCT Pub. Date: Jan. 19, 2023

(65) Prior Publication Data

US 2024/0278772 A1 Aug. 22, 2024

(30) Foreign Application Priority Data

Jul. 12, 2021 (JP) ................................. 2021-114887

(51) Int. Cl.
*B60W 30/045* (2012.01)
*B60W 30/12* (2020.01)
(52) U.S. Cl.
CPC .......... *B60W 30/045* (2013.01); *B60W 30/12* (2013.01)
(58) Field of Classification Search
None
See application file for complete search history.

(56) References Cited

U.S. PATENT DOCUMENTS

2008/0133066 A1 6/2008 Takenaka
2013/0166101 A1* 6/2013 Noumura ................ F02D 41/10
701/1

(Continued)

FOREIGN PATENT DOCUMENTS

EP 4265496 A1 10/2023
JP 2004-175125 A 6/2004

(Continued)

OTHER PUBLICATIONS

Extended European Search Report issued on Jun. 11, 2025 for European Patent Application No. 22841793.7.

(Continued)

*Primary Examiner* — Arslan Azhar
(74) *Attorney, Agent, or Firm* — Volpe Koenig

(57) ABSTRACT

A vehicle motion control device includes: an actuator characteristic change estimation unit configured to estimate a characteristic change of an actuator at a future time from a current time; a controllable range estimation unit configured to calculate a controllable range of a vehicle motion from a characteristic change calculated by the actuator characteristic change estimation unit, a target track of a vehicle, and a current vehicle state; a vehicle motion planning unit configured to create a motion plan within a controllable range calculated by the controllable range estimation unit; an evaluation value calculation unit configured to calculate an evaluation value based on a motion plan created by the vehicle motion planning unit; and a determination unit configured to determine whether or not an evaluation value calculated by the evaluation value calculation unit is minimum.

17 Claims, 8 Drawing Sheets

(56) References Cited

U.S. PATENT DOCUMENTS

| | | | |
|---|---|---|---|
| 2014/0129083 A1* | 5/2014 | O'Connor Gibson | ........................ B60W 10/22 701/112 |
| 2018/0079272 A1* | 3/2018 | Aikin | .................... B60W 10/22 |
| 2018/0141543 A1* | 5/2018 | Krosschell | ............. B60K 35/60 |
| 2020/0108828 A1* | 4/2020 | Yue | ........................ B62D 6/008 |
| 2020/0164870 A1 | 5/2020 | Takahashi et al. | |
| 2022/0135039 A1* | 5/2022 | Jardine | ........... B60W 30/18159 701/26 |

FOREIGN PATENT DOCUMENTS

| | | | |
|---|---|---|---|
| JP | 2010195323 | A | 9/2010 |
| JP | 2017-067227 | A | 4/2017 |
| JP | 2020-026189 | A | 2/2020 |
| WO | 2006/013922 | A1 | 2/2006 |
| WO | 2020182374 | A1 | 9/2020 |

OTHER PUBLICATIONS

International Search Report, PCT/JP2022/020684, Aug. 2, 2022, 2 pgs.

Chinese Office Action issued on Mar. 31, 2026 for Chinese Patent Application No. 202280049454.0.

* cited by examiner

ROLL ANGLE GENERATED IN VEHICLE PARTICULARLY
WHEN ACTUATOR OF VEHICLE IS NOT OPERATED
IN TRAVELLING TURNING TO LEFT
IN TRAVELING DIRECTION

UPPER LIMIT OF CONTROLLABLE ROLL ANGLE OBTAINED FROM MAXIMUM THRUST

LOWER LIMIT OF CONTROLLABLE ROLL ANGLE OBTAINED FROM MAXIMUM THRUST

ROLL ANGLE THAT MINIMIZES PLANNED EVALUATION VALUE WITHIN CONTROLLABLE ROLL ANGLE OBTAINED FROM MAXIMUM THRUST

INSTANTANEOUS CHARACTERISTIC OF SUSPENSION ACTUATOR

RATED CHARACTERISTIC OF SUSPENSION ACTUATOR

UPPER LIMIT OF ROLL ANGLE THAT CAN BE ACTUALLY ACHIEVED

LOWER LIMIT OF ROLL ANGLE THAT CAN BE ACTUALLY ACHIEVED

ROLL ANGLE THAT MINIMIZES PLANNED
EVALUATION VALUE WITHIN RANGE OF CONTROLLABLE
ROLL ANGLE OBTAINED FROM MAXIMUM THRUST

*FIG. 9*

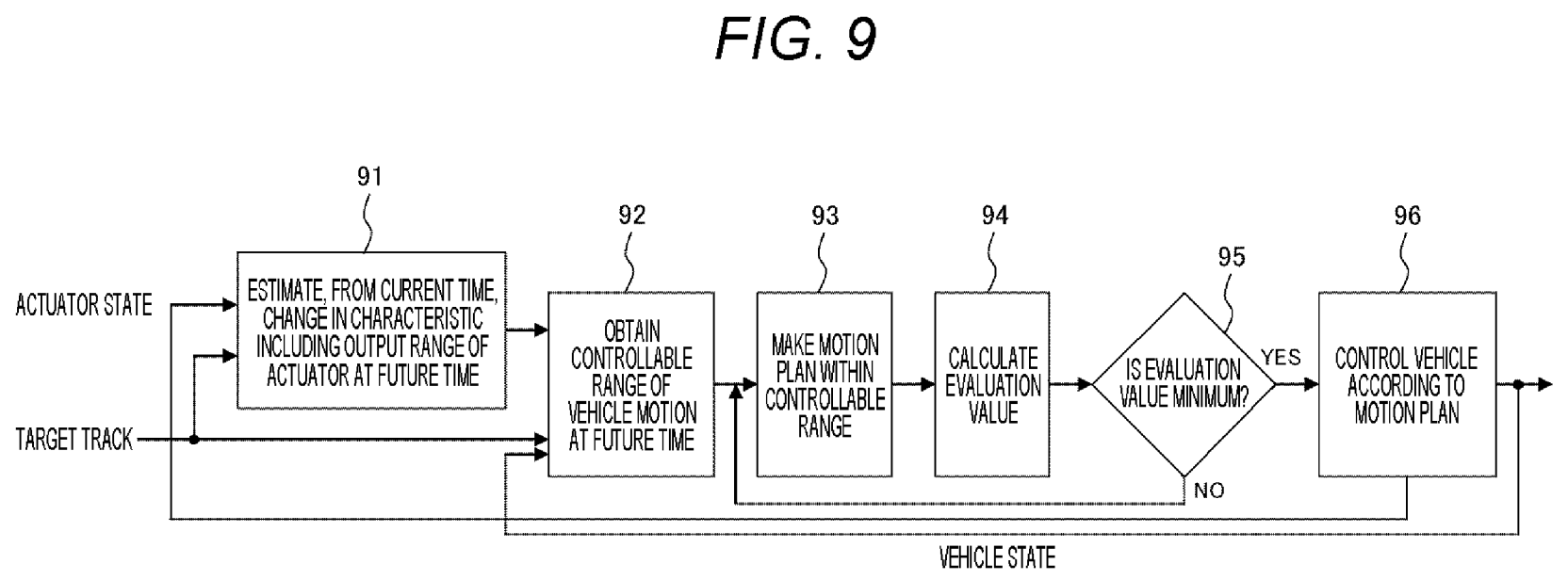

91 — ESTIMATE, FROM CURRENT TIME, CHANGE IN CHARACTERISTIC INCLUDING OUTPUT RANGE OF ACTUATOR AT FUTURE TIME

92 — OBTAIN CONTROLLABLE RANGE OF VEHICLE MOTION AT FUTURE TIME

93 — MAKE MOTION PLAN WITHIN CONTROLLABLE RANGE

94 — CALCULATE EVALUATION VALUE

95 — IS EVALUATION VALUE MINIMUM?

96 — CONTROL VEHICLE ACCORDING TO MOTION PLAN

YES

NO

ACTUATOR STATE

TARGET TRACK

VEHICLE STATE

PLAN OF ROLL ANGLE THAT MINIMIZES EVALUATION VALUE
CALCULATED BY METHOD OF PRESENT INVENTION

VEHICLE MOTION CONTROL DEVICE AND VEHICLE MOTION CONTROL METHOD

TECHNICAL FIELD

The present invention relates to a configuration of a control device that controls a motion of a vehicle and a control method thereof, and more particularly, to a technique effective for improving ride quality and steering stability of the vehicle.

BACKGROUND ART

An automobile is required not only as a mere means of transportation but also for safety and comfort, and has a very high expectation for ride quality such as smooth driving and handling stability such as easy driving together with improvement in fuel consumption and drive performance.

However, in an automobile, unlike a railway, a track and a destination are often not determined, and the automobile travels on a road surface having curves, slopes, and unevenness with various curvature and inclination when traveling on a general road. Therefore, it is an important problem to appropriately control the attitude of the vehicle, and control the motion of the vehicle so as to obtain good ride quality, while there is a limit on a drive range of an actuator such as a suspension actuator.

As a conventional technique for controlling a vehicle body attitude by controlling a suspension actuator, for example, a technique as disclosed in PTL 1 is known.

PTL 1 describes, in order to achieve both of maintaining at least one of the ride quality and the handling stability well by adjusting a damping force of a shock absorber, and suppressing the temperature rise of hydraulic oil inside the shock absorber during vehicle traveling, a method of obtaining the temperature of the hydraulic oil inside the shock absorber by measurement or estimation and adjusting to a damping amount between a damping amount for maintaining at least one of the ride quality and the handling stability well and a damping amount for suppressing the temperature rise of the hydraulic oil inside the shock absorber according to the temperature.

CITATION LIST

Patent Literature

PTL 1: JP 2004-175125 A

SUMMARY OF INVENTION

Technical Problem

However, since the method by PTL 1 described above does not take into consideration the limit due to the future temperature rise of the hydraulic oil of the shock absorber, when the temperature rise inside the hydraulic oil is large, there is a possibility that ride quality and handling stability cannot be maintained well halfway through the traveling.

For this reason, although initially the ride quality and the handling stability are good, the ride quality and the handling stability are suddenly lost, and there is a case where the characteristics of the vehicle cannot be felt well instead.

Therefore, an object of the present invention is to provide a vehicle motion control device and a vehicle motion control method capable of performing highly accurate vehicle motion control in consideration of limits that will occur in actuators in the future.

Solution to Problem

In order to solve the above problems, the present invention is characterized by including: an actuator characteristic change estimation unit configured to estimate a characteristic change of an actuator at a future time from a current time; a controllable range estimation unit configured to calculate a controllable range of a vehicle motion from a characteristic change calculated by the actuator characteristic change estimation unit, a target track of a vehicle, and a current vehicle state; a vehicle motion planning unit configured to create a motion plan within a controllable range calculated by the controllable range estimation unit; an evaluation value calculation unit configured to calculate an evaluation value based on a motion plan created by the vehicle motion planning unit; and a determination unit configured to determine whether or not an evaluation value calculated by the evaluation value calculation unit is minimum. The controllable range estimation unit refers to a target track of the vehicle and calculates a controllable vehicle motion range at a future time in consideration of a characteristic including at least an output range of an actuator regarding a vehicle motion from a current time. The vehicle motion planning unit creates a motion plan with reference to a predetermined evaluation function within the controllable vehicle motion range calculated by the controllable range estimation unit.

In addition, the present invention is characterized by including: referring to a target track of a vehicle and obtaining a controllable vehicle motion range at a future time in consideration of a characteristic including at least an output range of an actuator regarding a vehicle motion from a current time; and creating a motion plan with reference to a predetermined evaluation function within the range.

Advantageous Effects of Invention

According to the present invention, it is to possible to achieve a vehicle motion control device and a vehicle motion control method capable of performing highly accurate vehicle motion control in consideration of limits that will occur in actuators in the future.

Accordingly, it is possible to appropriately control the attitude of the vehicle and maintain good ride quality and handling stability while there is a limit on the driving of the actuator, such as temperature rise of the hydraulic oil and exhaustion of the power source.

Problems, configurations, and effects other than those described above will be clarified by the following description of embodiments.

BRIEF DESCRIPTION OF DRAWINGS

FIG. 9 is a diagram showing a flow of determining a roll angle that minimizes an evaluation value.

DESCRIPTION OF EMBODIMENTS

Figure 1:
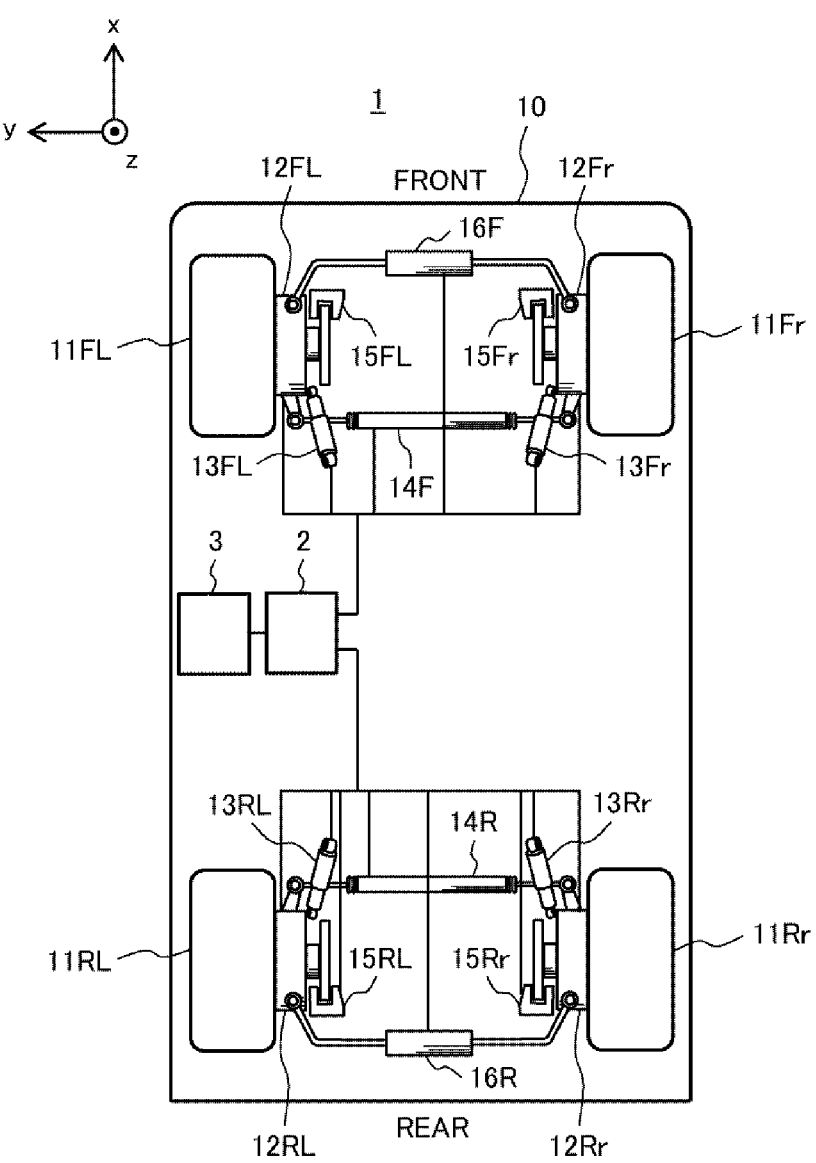
FIG. 1 is a diagram showing a schematic configuration of a vehicle according to a first embodiment of the present invention.

Hereinafter, embodiments of the present invention will be described with reference to the drawings. It should be noted that in each of the drawings, the same configurations are denoted by the same reference numerals, and the detailed description of redundant components is omitted.

First Embodiment

With reference to FIGS. 1 to 10, a vehicle motion control device and a control method thereof according to a first embodiment of the present invention will be described.

FIG. 1 is a plan view showing a schematic configuration of a vehicle 1 mounted with a vehicle motion control device 2 of the present embodiment. As shown in FIG. 1, a vehicle 1 of the present embodiment is a vehicle body 10 mounted with wheels 11, motors 12, suspension actuators 13, steering mechanisms 14, brake mechanisms 15, and stabilizers 16. In addition, the vehicle 1 is mounted with, together with a vehicle motion control device 2, a host controller 3 that controls the vehicle motion control device 2.

It should be noted that the other components are mounted in the same manner as in a normal vehicle, but are not necessary for the description of the embodiment of the present invention, and thus illustration and description thereof are omitted.

In addition, a coordinate system is applied to the front-rear direction of the vehicle 1 as an x axis (the front direction is positive), the left-right direction as a y axis (the left direction is positive), and the up-down direction as a z axis (the upper direction is positive).

In FIG. 1, FL, Fr, RL, and Rr are signs indicating a configuration corresponding to a left front, a right front, a left rear, and a right rear, respectively. When the wheels 11 are taken as an example, $11_{FL}$, $11_{Fr}$, $11_{RL}$, and $11_{Rr}$ are a left front wheel, a right front wheel, a left rear wheel, and a right rear wheel, respectively. In addition, when F and R are used alone, F indicates a configuration corresponding to the front side, and R indicates a configuration corresponding to the rear side.

A motor 12 ($12_{FL}$, $12_{Fr}$, $12_{RL}$, and $12_{Rr}$) which is an in-wheel motor is attached to each of the wheels 11, and driving and braking torques are independently applied to the respective wheels 11 by these motors 12.

A suspension actuator 13 ($13_{FL}$, $13_{Fr}$, $13_{RL}$, and $13_{Rr}$) is provided between each of the wheels 11 and the vehicle body 10 with interposition of a casing of the in-wheel motor, and these suspension actuators 13 absorb vibrations and shocks to be received by each of the wheels 11 and control the attitude of the vehicle body 10 by adjusting the positions of the vehicle body 10 and the wheels 11.

It should be noted that the suspension actuator includes, for example, a semi-active suspension in which a damper capable of changing viscosity and a coil spring are combined, a full active suspension capable of adjusting the viscosity and a spring constant by an electromagnetic linear actuator that generates thrust, and the like, and hereinafter, the suspension actuator 13 will be described as a full active suspension.

The steering mechanism 14 is a device for steering the wheels 11 to change the traveling direction of the vehicle 1. In the present embodiment, the front wheels are steered by the front wheel steering mechanism $14_F$, and the rear wheels are steered by the rear wheel steering mechanism $14_R$.

The brake mechanism 15 is a device for braking the rotation of the wheel 11, and in the present embodiment, includes four brakes of a brake $15_{FL}$ for the left front wheel $11_{FL}$, a brake $15_{Fr}$ for the right front wheel $11_{Fr}$, a brake $15_{RL}$ for the left rear wheel $11_{RL}$, and a brake $15_{Rr}$ for the right rear wheel $11_{Rr}$.

The stabilizer 16 is a device that suppresses the relative motion of the left and right wheels 11 in the up-down direction to suppress the roll amount of the vehicle 1, and the stabilizer 16 of the present embodiment is a control stabilizer that can electrically adjust the torsion angle thereof. It should be noted that in the present embodiment, two stabilizers of a front stabilizer $16_F$ and a rear stabilizer $16_R$ are provided.

Figure 2:
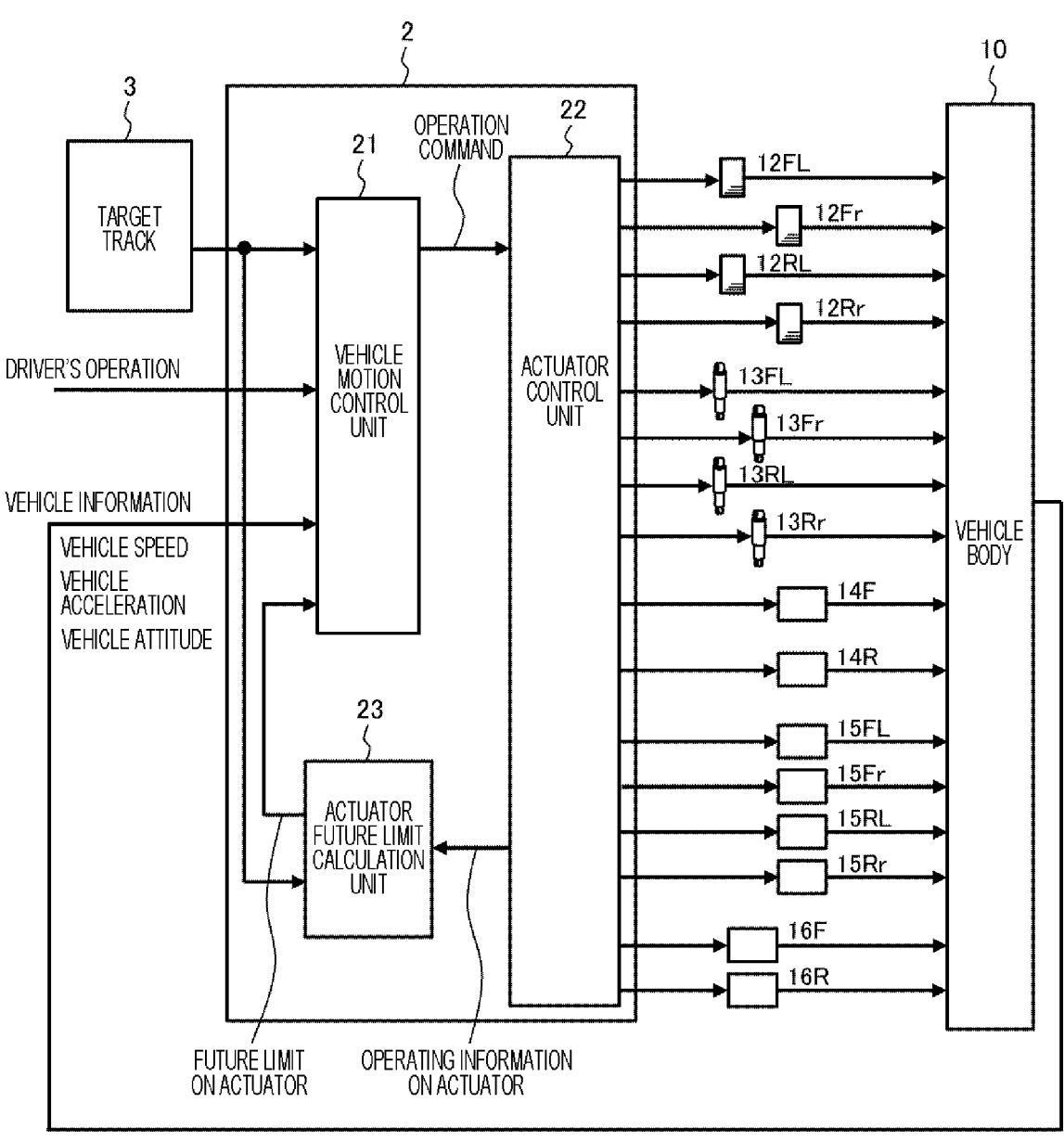
FIG. 2 is a functional block diagram of a vehicle motion control device according to the first embodiment of the present invention.

FIG. 2 is a functional block diagram showing connections and controls of signal lines in the entire vehicle, regarding the components and the vehicle motion control device 2, according to the present invention.

As shown in FIG. 2, the vehicle motion control device 2 is configured to operate the respective actuators such as the motors 12, the suspension actuators 13, the steering mechanisms 14, the brake mechanisms 15, and the stabilizers 16 according to the operation of the driver, a command from the host controller 3 (such as a target track), and vehicle information (vehicle speed, longitudinal, lateral, and vertical accelerations, roll rate, pitch rate, yaw rate, and the like) related to the motion and the attitude of the vehicle from a combined sensor (not shown) mounted on the vehicle body 10 and the like.

The functions of the vehicle motion control device 2 include a vehicle motion control unit 21, an actuator control unit 22, and an actuator future limit calculation unit 23, and the vehicle motion control unit 21 generates an operation command and inputs the operation command to the actuator control unit 22.

In addition, the actuator control unit 22 generates an individual command to each actuator from the input operation command.

The actuator future limit calculation unit 23 is configured to calculate a future limit of the actuator from the operation information on the actuator and the target track and transmit the calculated future limit to the vehicle motion control unit 21.

Figure 3:
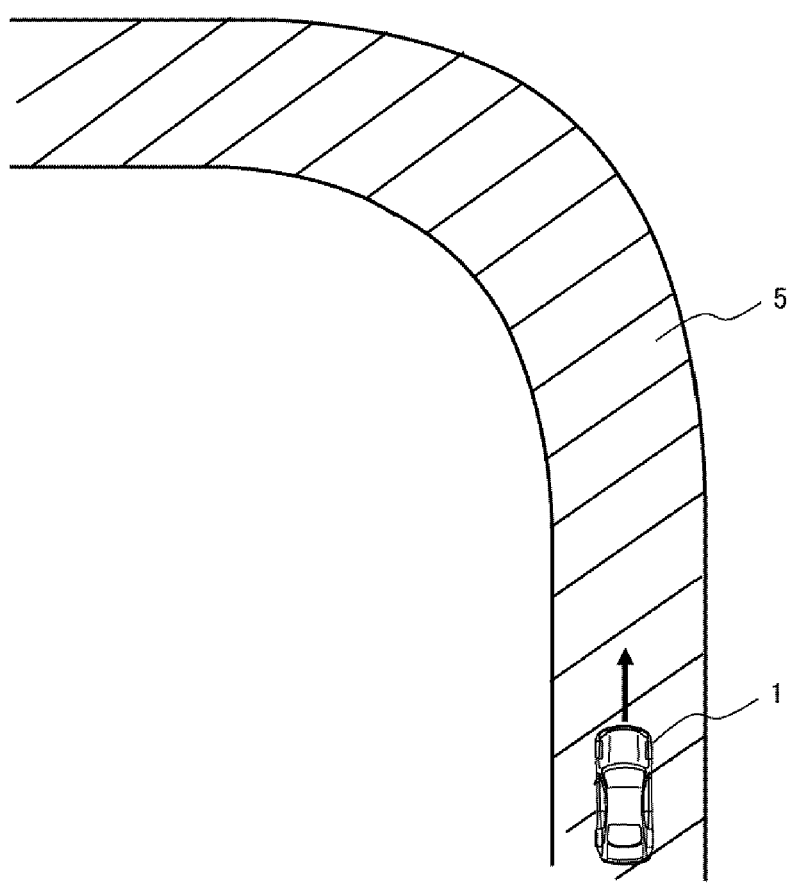
FIG. 3 is a diagram showing a state of the vehicle and a traveling surface thereof.

A specific operation according to the present embodiment will be described with an example in which the vehicle 1 travels from the straight traveling state to the turning to the left arcuately and then returns to the straight traveling. FIG. 3 is a diagram showing a state of the vehicle 1 and a traveling surface thereof. The vehicle 1 travels along the road surface 5, and with turning to the left arcuately in the traveling direction.

Figure 4:
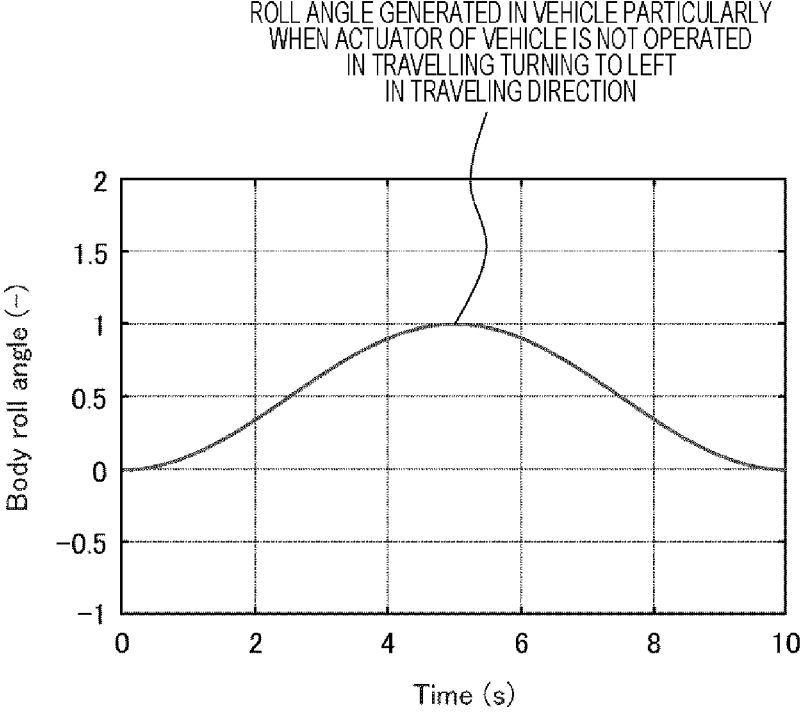
FIG. 4 is a diagram showing a change in a roll angle generated in the vehicle when the actuator of the vehicle is not operated.

First, FIG. 4 shows a change in the roll angle generated in the vehicle 1 particularly when the actuator of the vehicle 1 is not operated. In FIG. 4, the roll angle is plotted as a dimensionless quantity with a maximum value of 1. It should be noted that in the drawings of the present embodiment regarding the roll angle, all are plotted in a dimensionless quantity.

The vehicle 1 travels to the center of the corner while gradually increasing the steering gear so as to travel along the road surface 5, and then travels to the corner exit while gradually turning the steering gear backward. In FIG. 4, the vehicle starts turning at a time of 0 seconds, travels to the center of the corner at a time of 5 seconds, passes through the corner at a time of 10 seconds, and returns to a straight traveling state.

During this time, assuming that the speed of the vehicle 1 is constant, the lateral acceleration acting on the vehicle 1 becomes an amount substantially proportional to the steering angle, and becomes a protruding shape between times 0 seconds and 10 seconds. In addition, since the roll angle is an angle substantially proportional to the lateral acceleration, the roll angle of the vehicle 1 similarly has a protruding shape between times 0 seconds and 10 seconds, and has a shape as shown in FIG. 4.

Here, when the suspension actuator 13 is operated as an actuator and change the roll angle, assuming that the suspension actuator 13 can always produce the maximum thrust during cornering, it is possible to control the roll angle shown in FIG. 4 up to an angle having a width corresponding to the thrust in a direction of increasing the roll angle and in a direction of decreasing the roll angle, and a range of the controllable roll angle is between the upper limit of the controllable roll angle and the lower limit of the controllable roll angle.

Figure 5:
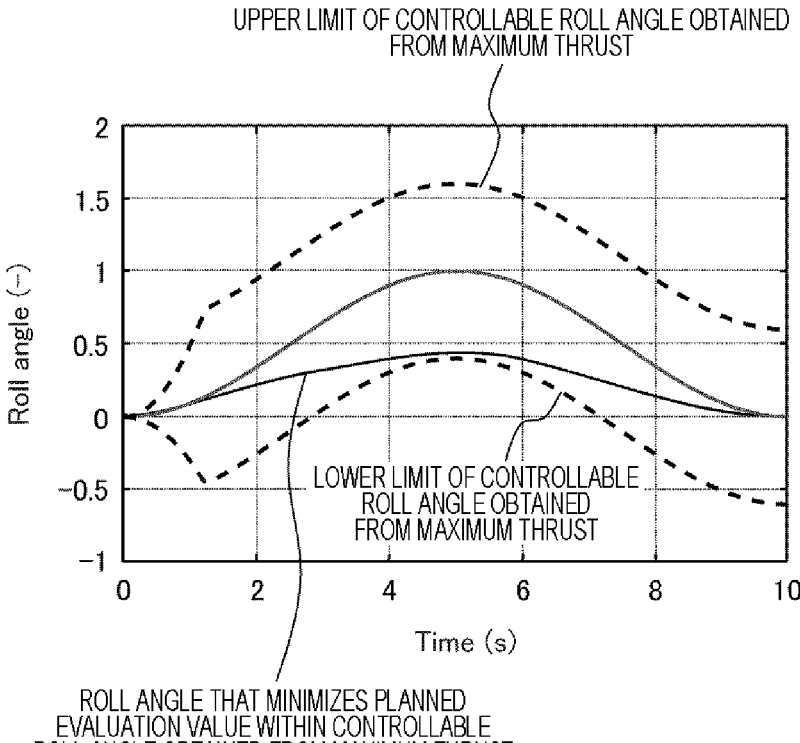
FIG. 5 is a diagram showing a range of controllable roll angles.

FIG. 5 shows ranges of controllable roll angles in which the upper limit and the lower limit are plotted by broken lines. If the roll angle is planned to minimize a predetermined evaluation function within the range of the controllable roll angle, a vehicle motion suitable for the evaluation can be achieved. Here, from the viewpoint that the flat vehicle motion improves the ride quality, the evaluation function is set to the sum of squares of the roll angle with the target of controlling the roll angle to 0 degrees. As a result, the roll angle that minimizes the planned evaluation value is shown in FIG. 5.

Figure 6:
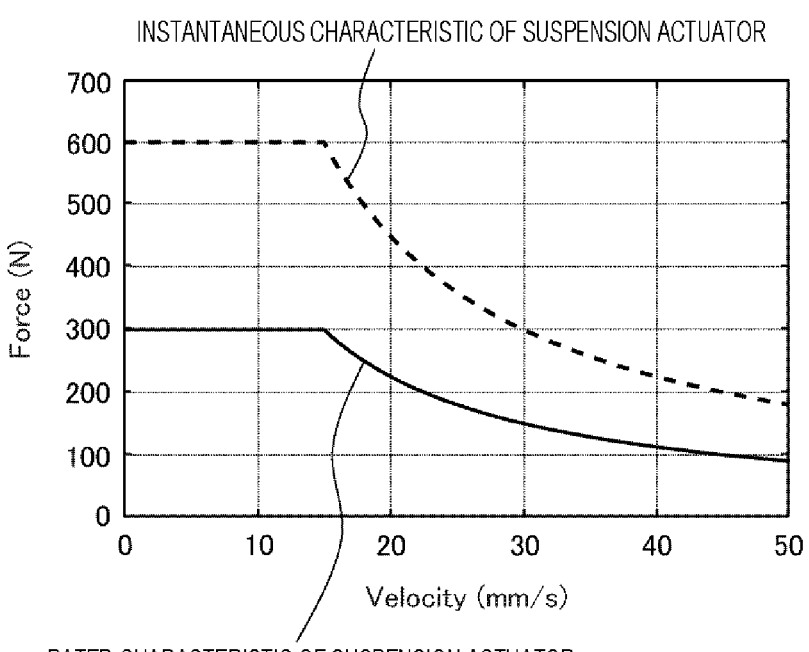
FIG. 6 is a diagram showing characteristics of an operation speed and a thrust of a suspension actuator.

Here, the output characteristics of the suspension actuator 13 will be considered. FIG. 6 shows characteristics of the operation speed and the thrust of the suspension actuator 13 used in the present embodiment.

The present actuator is a type that generates thrust using electromagnetic force, and has instantaneous characteristics and rated characteristics. That is, when the coil of the actuator is sufficiently cooled, large power can be applied and large thrust can be generated, but the coil temperature rises due to energization, and when the temperature exceeds the limit point, the coil is damaged. Therefore, when the coil temperature rises, it is necessary to lower the power to be applied, and the thrust decreases.

The characteristic in the case of having been cooled in the former is an instantaneous characteristic, and the characteristic in the case of lowering the power to prevent an excessive rise in temperature in the latter is a rated characteristic. When this actuator is used, it is roughly about 5 seconds that this actuator can be operated with the maximum thrust of the instantaneous characteristic.

Due to the characteristics of the suspension actuator 13, when the suspension actuator 13 works, the temperature rises, and when the temperature rise is large, it is necessary to reduce the thrust to use the suspension actuator 13 for protection. By taking this into account, the controllable roll angle range is obtained.

Figure 7:
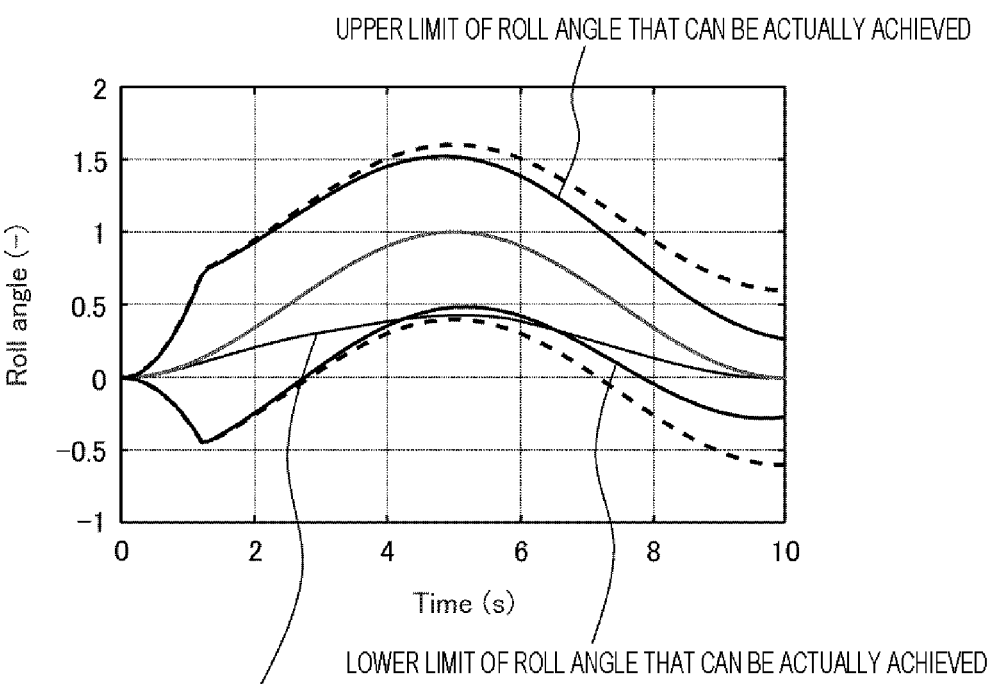
FIG. 7 is a diagram showing an upper limit and a lower limit of a roll angle that can be actually achieved in consideration of characteristics of an actuator.

FIG. 7 is a diagram showing an upper limit and a lower limit of a roll angle that can be actually achieved in consideration of characteristics of an actuator. As shown in FIG. 7, the upper limit and the lower limit that can be actually achieved in consideration of the characteristics of the actuator respectively come closer in the direction of the roll angle generated in the vehicle 1 when the actuator of the vehicle 1 is not operated than the upper limit and the lower limit of the controllable roll angle obtained from the maximum thrust indicated by the broken line, and the controllable range becomes small.

From FIG. 7, it can be seen that the roll angle that minimizes the planned evaluation value deviates from the actually achievable controllable range of the suspension actuator 13, and the control fails.

Figure 8:
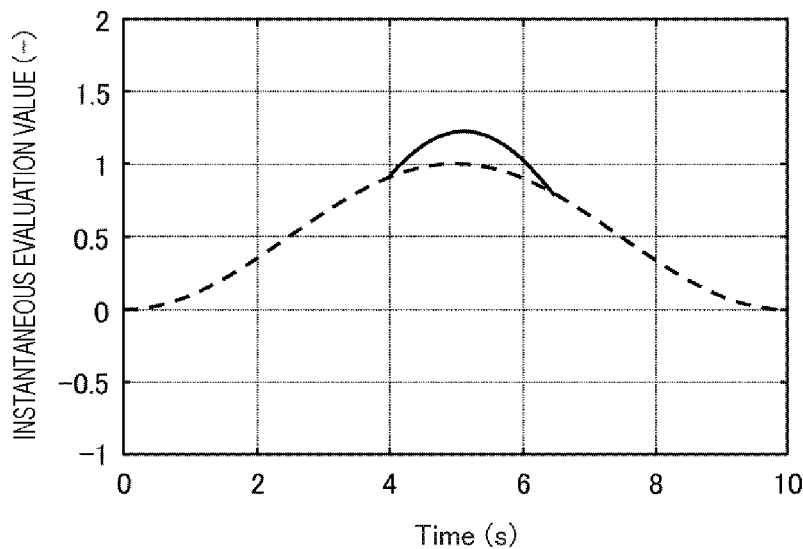
FIG. 8 is a diagram showing transition of instantaneous evaluation values.

FIG. 8 shows, in the transition of the instantaneous evaluation value, a state in which the control to the planned roll angle cannot be performed due to the deviation. As compared with the evaluation value when the roll angle can be controlled according to the plan indicated by the broken line, when the failure occurs, it can be seen that the evaluation value rapidly increases from the time of failure, that is, 4 seconds in FIG. 8 and a discontinuity point occurs. For the occupant of the vehicle 1, this causes a phenomenon in which the roll angle suddenly changes and in which the occupant feels discomfort, which results in deterioration of ride quality.

Therefore, in the present invention, the roll angle is controlled by the flow shown in FIG. 9.

First, the actuator characteristic change estimation unit 91 estimates from the current time a change in the output characteristic of the suspension actuator 13 at a future time. Here, the future temperature of the coil is estimated from the current temperature estimation value of the coil of the actuator and the necessary thrust of the actuator assumed when traveling on the target track, and the change in the output characteristic is estimated from the temperature thereof.

Next, the controllable range estimation unit 92 of the vehicle motion obtains the controllable range of the vehicle motion from the estimated value of the actuator (the change in the output characteristic calculated by the actuator characteristic change estimation unit 91), the target track, and the current vehicle state. As shown in FIG. 7, the upper limit of the controllable roll angle and the lower limit of the controllable roll angle are obtained in consideration of the change in the output characteristic of the suspension actuator 13 at a future time calculated by the actuator characteristic change estimation unit 91, in addition to the roll angle generated in the vehicle 1 particularly when the actuator of the vehicle 1 is not operated.

Next, the vehicle motion planning unit 93 makes a motion plan within the controllable range calculated by the controllable range estimation unit 92 of the vehicle motion.

Next, the evaluation value calculation unit 94 calculates an evaluation value C* based on the motion plan created by the vehicle motion planning unit 93. Here, as shown in Formula (1), the sum of squares of the difference between the ideal roll angle $\varphi i$ and the actual roll angle $\varphi$ is obtained.

[Mathematical 1]

$$C \mathrel{*}= \sum (\varphi_i - \varphi)^2 \tag{1}$$

Next, the determination unit 95 determines whether or not the evaluation value C* calculated by the evaluation value calculation unit 94 is minimum. If it is not the minimum (NO), the process returns to the vehicle motion planning unit 93 to perform re-planning. If it is the minimum (YES), the motion plan is set as a determined value.

Next, the vehicle control unit 96 controls the vehicle based on the determined motion plan.

It should be noted that, in the present embodiment, in order to simplify and describe the principle of the invention, the description has been made with the contents of controlling only one degree of freedom of the roll angle. Therefore, the object to be evaluated is only the roll angle, but when control with two or more degrees of freedom is performed, the motion of the vehicle is planned so that the evaluation value thereof is minimized using the evaluation function.

For example, as shown in Formula (2), the sum of squares of the difference between the ideal roll angle φi and the actual roll angle φ, and the difference between the ideal pitch angle θi and the actual pitch angle θ may be obtained.

Furthermore, as shown in Formula (3), an evaluation value in six degrees of freedom of the motion of the vehicle 1 may be calculated, and the motion of the vehicle 1 may be planned so as to minimize the evaluation value.

It should be noted that the evaluation function may be, in addition to this, MSI (motion sickness incidence), G (acceleration), Jerk, a weighted addition value of G (acceleration) and Jerk, or a weighted addition value thereof. In addition, the evaluation function may be a function for obtaining an outside of the controllable range from the range of the vehicle motion.

[Mathematical 2]

$$C \mathrel{*}= \sum (\varphi_i - \varphi)^2 + (\theta_i - \theta)^2 \tag{2}$$

[Mathematical 3]

$$C \mathrel{*}= \sum f(G_x, G_y, G_z, \varphi, \theta, \dot{\psi}) \tag{3}$$

Figure 10:
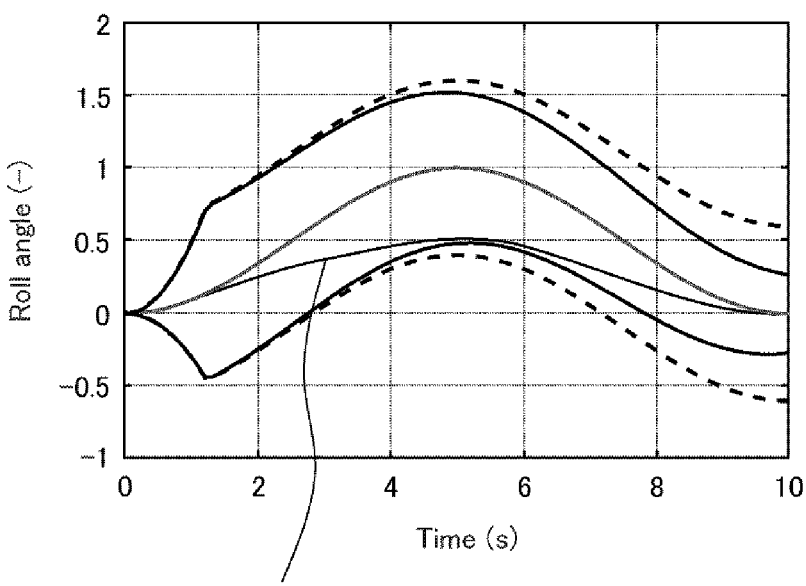
FIG. 10 is a diagram showing a plan of a roll angle that minimizes an evaluation value calculated by the method of the present invention.

FIG. 10 shows a plan of the roll angle that minimizes the evaluation value, calculated by the method of the present invention shown in FIG. 9. The motion plan of the roll angle can be set in consideration of the change in the future output characteristic of the actuator, the control failure can be prevented, the deterioration of the ride quality can be prevented, and the roll angle can be controlled to the best roll angle.

As described above, the vehicle motion control device 2 according to the present embodiment includes: an actuator characteristic change estimation unit 91 configured to estimate a characteristic change of an actuator at a future time from a current time; a controllable range estimation unit 92 configured to calculate a controllable range of a vehicle motion from a characteristic change calculated by the actuator characteristic change estimation unit 91, a target track of a vehicle, and a current vehicle state; a vehicle motion planning unit 93 configured to create a motion plan within a controllable range calculated by the controllable range estimation unit 92; an evaluation value calculation unit 94 configured to calculate an evaluation value based on a motion plan created by the vehicle motion planning unit 93; and a determination unit 95 configured to determine whether or not an evaluation value calculated by the evaluation value calculation unit 94 is minimum. The controllable range estimation unit 92 refers to a target track of the vehicle and calculates a controllable vehicle motion range at a future time in consideration of a characteristic including at least an output range of an actuator regarding a vehicle motion from a current time. The vehicle motion planning unit 93 creates a motion plan with reference to a predetermined evaluation function within the controllable vehicle motion range calculated by the controllable range estimation unit 92.

It should be noted that the vehicle motion is a vehicle motion with six degrees of freedom of an acceleration in a front-rear direction, an acceleration in a lateral direction, an acceleration in an up-down direction, a roll angle, a pitch angle, and a yaw rate of the vehicle 1. Alternatively, it is a vehicle motion with six degrees of freedom of an acceleration in a front-rear direction, an acceleration in a lateral direction, a position in an up-down direction, a roll angle, a pitch angle, and a yaw rate of the vehicle 1.

In addition, a characteristic including at least an output range of the actuator is a characteristic over a future of an output range and a movable range of the actuator on a time axis.

In addition, when the vehicle 1 follows the target track and an output of an actuator necessary for the following is determined, a margin range between a controllable vehicle motion at a future time from the state and a vehicle motion for traveling on a target track without using a motion plan by the vehicle motion planning unit 93 is set as a controllable vehicle motion range.

In addition, the vehicle motion planning unit 93 creates a motion plan that minimizes a predetermined evaluation function within the controllable vehicle motion range.

In addition, the predetermined evaluation function is a function that obtains a controllable range from a range of a vehicle motion when a characteristic including at least an output of an actuator is considered, and maximizing the range predetermined evaluation function is set as an evaluation.

In addition, the motion plan is an attitude angle of the vehicle body 10, such as a roll angle and a pitch angle.

As described above, according to the vehicle motion control device of the present embodiment, the operation command of each actuator can be calculated in consideration of the temperature rise caused by the operation of the actuator and the limit to be caused in the future by the exhaustion of the power source, and good ride quality and handling stability can be maintained.

It should be noted that the present invention is not limited to the embodiments described above, and includes various modifications. For example, the above-described embodiments are described in detail for easy understanding of the present invention, and are not necessarily limited to those including all the configurations described. In addition, a part of the configuration of one embodiment can be replaced with the configuration of another embodiment, and the configuration of another embodiment can be added to the configuration of one embodiment. In addition, it is possible to add, delete, and replace another configuration with respect to a part of the configuration of each of the embodiments.

REFERENCE SIGNS LIST

1 vehicle
2 vehicle motion control device

3 host controller
5 road surface
10 vehicle body
11 ($11_{FL}$, $11_{Fr}$, $11_{RL}$, $11_{Rr}$) wheel
12 ($12_{FL}$, $12_{Fr}$, $12_{RL}$, $12_{Rr}$) motor
13 ($13_{FL}$, $13_{Fr}$, $13_{RL}$, $13_{Rr}$) suspension actuator
14 ($14_F$, $14_R$) steering mechanism
($15_{FL}$, $15_{Fr}$, $15_{RL}$, $15_{Rr}$) brake mechanism
16 ($16_F$, $16_R$) stabilizer
21 vehicle motion control unit
22 actuator control unit
23 actuator future limit calculation unit
91 actuator characteristic change estimation unit
92 controllable range estimation unit of vehicle motion
93 vehicle motion planning unit
94 evaluation value calculation unit
95 determination unit
96 vehicle control unit
The invention claimed is:

1. A vehicle motion control device comprising:
an actuator characteristic change estimation unit configured to estimate a characteristic change of an actuator at a future time from a current time;
a controllable range estimation unit configured to calculate a controllable range of a vehicle motion from the characteristic change calculated by the actuator characteristic change estimation unit, a target track of a vehicle, and a current vehicle state;
a vehicle motion planning unit configured to create a motion plan within the controllable range calculated by the controllable range estimation unit;
an evaluation value calculation unit configured to calculate an evaluation value based on the motion plan created by the vehicle motion planning unit; and
a determination unit configured to determine whether or not the evaluation value calculated by the evaluation value calculation unit is a minimum value,
wherein the controllable range estimation unit refers to the target track of the vehicle and calculates a controllable vehicle motion range at the future time in consideration of a characteristic including at least an output range of an actuator regarding a vehicle motion from a current time, and
wherein the vehicle motion planning unit creates the motion plan with reference to a predetermined evaluation function within the controllable vehicle motion range calculated by the controllable range estimation unit to enable vehicle motion control counteracting one or more limits of the actuator.

2. The vehicle motion control device according to claim 1, wherein the vehicle motion is a vehicle motion with six degrees of freedom of an acceleration in a front-rear direction, an acceleration in a lateral direction, an acceleration in an up-down direction, a roll angle, a pitch angle, and a yaw rate.

3. The vehicle motion control device according to claim 1, wherein the vehicle motion is a vehicle motion with six degrees of freedom of an acceleration in a front-rear direction, an acceleration in a lateral direction, a position in an up-down direction, a roll angle, a pitch angle, and a yaw rate.

4. The vehicle motion control device according to claim 1, wherein the characteristic including the at least the output range of the actuator comprises a characteristic over a future of the output range and a movable range on a time axis.

5. The vehicle motion control device according to claim 1, wherein when the vehicle follows the target track and an output of an actuator necessary for the following is determined, a margin range between a controllable vehicle motion at the future time from the state and a vehicle motion for traveling on the target track without using the motion plan by the vehicle motion planning unit is set as a controllable vehicle motion range.

6. The vehicle motion control device according to claim 5, wherein the motion plan is created that minimizes a predetermined evaluation function within the controllable vehicle motion range.

7. The vehicle motion control device according to claim 1, wherein the predetermined evaluation function is a function based on a calculation of MSI (motion sickness incidence), G (acceleration), Jerk, a weighted addition value of G and Jerk, or a weighted addition value of these.

8. The vehicle motion control device according to claim 1 wherein the predetermined evaluation function is a function that obtains the controllable range from a range of a vehicle motion when a characteristic including at least an output range of an actuator is considered, and maximizing the predetermined evaluation function is set as an evaluation.

9. The vehicle motion control device according to claim 1, wherein the motion plan is an attitude angle of a vehicle body.

10. The vehicle motion control device according to claim 1, wherein the one or more limits of the actuator comprise temperature rise of a hydraulic oil of the actuator or exhaustion of a power source of the actuator.

11. The vehicle motion control device according to claim 1, wherein the motion plan is regenerated if the evaluation value is not the minimum value.

12. A vehicle motion control method comprising:
referring to a target track of a vehicle and obtaining a controllable vehicle motion range at a future time in consideration of a characteristic including at least an output range of an actuator regarding a vehicle motion from a current time; and
creating a motion plan with reference to a predetermined evaluation function within the range to enable vehicle motion control counteracting one or more limits of the actuator.

13. The vehicle motion control method according to claim 12, wherein the vehicle motion is a vehicle motion with six degrees of freedom of an acceleration in a front-rear direction, an acceleration in a lateral direction, an acceleration in an up-down direction, a roll angle, a pitch angle, and a yaw rate.

14. The vehicle motion control method according to claim 12, wherein the vehicle motion is a vehicle motion with six degrees of freedom of an acceleration in a front-rear direction, an acceleration in a lateral direction, a position in an up-down direction, a roll angle, a pitch angle, and a yaw rate.

15. The vehicle motion control method according to claim 12, wherein the characteristic including the at least the output range of the actuator comprises a characteristic over a future of the output range and a movable range on a time axis.

16. The vehicle motion control method according to claim 12, wherein when the vehicle follows the target track and an output of an actuator necessary for the following is determined, a margin range between a controllable vehicle motion at the future time from the state and a vehicle motion for traveling on the target track without using the motion plan by the vehicle motion control method is set as a controllable vehicle motion range.

17. The vehicle motion control method according to claim 16, wherein the motion plan is created that minimizes the predetermined evaluation function within the controllable vehicle motion range.

* * * * *